Patented Dec. 7, 1937

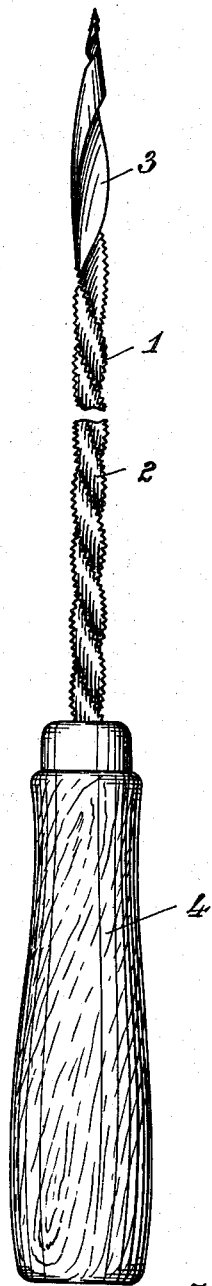

2,101,583

UNITED STATES PATENT OFFICE 2,101,583

HAND TOOL FOR BORING, SAWING, AND RASPING WOOD AND LIKE MATERIALS

Friedrich August Hönneknövel, Remscheid-Bliedinghausen, Germany

Application December 5, 1934, Serial No. 756,037
In Germany December 13, 1933

2 Claims. (Cl. 145—117)

The object of the present invention is to provide a hand tool which can be used for boring holes in wood and like materials and subsequently sawing and rasping the same workpiece. The improved tool is intended to be used for producing designs in wooden or like plates, for instance by cutting out figures from such plates. Hitherto it was necessary to employ for this purpose several different tools, for instance, borers, ripping chisels, jaggers and fret or piercing saws and like tools. These various tools had to be used one after the other and consequently the labour and time required for cutting out figures from a wooden plate or similar workpiece, was very considerable. If, for instance, it was desired to cut out a heart-shaped figure from a wooden plate, it was necessary to bore first several holes close to the inner edge of the profile or figure to be cut out and then cut out the figure roughly by means of a fret or piercing saw. As it is impossible to produce arcuate or like shapes by means of a fret or piercing saw, it was as a rule necessary to finish the work by means of a rasp so as to obtain the exact shape of the figure to be cut out or the desired profile.

It is possible to carry out all the operations which were hitherto carried out by means of different tools, in one operation by means of the improved tool forming the subject of the invention. The improved hand tool, according to the present invention, comprises a multi-edged, for instance, a quadrangular or triangular steel rod provided upon its edges with teeth, and then twisted about its axis after the manner of a screw so as to constitute a tool which upon the major part of its length is similar to a reamer needle and is formed at the point as a borer. The reamer needle proper is of smaller diameter than the borer portion of the tool, to enable the tool to be used first as a borer and subsequently as a saw, reamer or a rasp.

In operation the tool is first applied with its borer point at the initial point of a figure drawn upon a wooden plate, and is turned by means of a handle or grip to produce by means of the borer point a hole in the plate close to the edge of the figure to be cut out. The longer portion of the tool constituting a reamer needle is then moved to and fro by means of the handle or grip along the lines of the figure to be cut, the tool being used for cutting out, that is, like a saw. It is advisable to choose the diameter of the tool in accordance with the nature of the work required. Moreover, the tool may be provided with coarse or fine teeth to suit the nature of the work and the material. In most cases the tool can be used also as a finishing tool for smoothing the edges.

The accompanying drawing shows by way of example a tool embodying the features of the invention in elevation.

In the drawing 2 indicates the major portion of the tool which is provided with teeth 1, the teeth being so shaped and arranged that they enable the tool to be used either as a saw or as a rasp. In making the tool, a multi-edged, for instance, quadrangular or triangular steel rod or a rod having an approximately elliptical section is first provided with teeth 1 upon its edges at regular intervals. The steel rod is then twisted to form a screw, whereby the teeth are moved in to an inclined position with regard to the axis of the tool and are also staggered relatively to each other. As after the twisting operation, the base of the tooth is arranged at an angle to the axis of the tool, the tool can be used readily for cutting. The chips or shavings produced during the operation, can easily slide away from the workpiece, owing to the fact that they are conveyed at the bases of the teeth along into channels formed in the tool by the screw like twisting of the rod. Clogging of the teeth is therefore avoided and the tool is self-cleaning upon the whole surface of the reamer needle 2 provided with teeth 1.

The twisted steel rod is formed at the point as a borer 3 as shown in the drawing. The diameter of the borer 3 is slightly larger than that of the reamer needle proper so that after the hole has been bored in the workpiece, the cutting out of the figure by means of the reamer portion of the tool can immediately follow. The borer portion of the tool may, of course, be formed in any suitable manner.

At the other end the tool is provided with a wooden handle 4 to facilitate the operation of boring and sawing.

I claim:

1. A hand tool for boring, sawing and rasping, more particularly for use in woodwork, consisting of a shank portion formed by a multi-edged rod having helically running edges and provided on all sides with saw teeth running to a point and bounded by the side surfaces of the rod and a borer, the diameter of the rod measured across the points of the saw teeth being the same over the whole length of the shank portion and being not more than the diameter of the borer.

2. A hand tool for boring, sawing and rasping, more particularly for use in woodwork, comprising in combination: a shank portion formed by twisting a multi-edged rod so as to bring the edges thereof into the form of helices; acute-angled saw teeth having their sides terminating in a sharp point and formed on the helices of said edges; and a boring member of only slightly larger diameter than the diameter of said shank as measured between the points of the saw teeth, formed integral with said shank portion.

FRIEDRICH AUGUST HÖNNEKNÖVEL.